(12) United States Patent
Han

(10) Patent No.: US 7,328,777 B2
(45) Date of Patent: Feb. 12, 2008

(54) DISC BRAKE SYSTEM DRIVEN BY RACK

(75) Inventor: In-Hwan Han, Daejeon (KR)

(73) Assignee: Hyundai Motor Company, Seoul (KR)

( * ) Notice: Subject to any disclaimer, the term of this patent is extended or adjusted under 35 U.S.C. 154(b) by 178 days.

(21) Appl. No.: 11/302,405

(22) Filed: Dec. 12, 2005

(65) Prior Publication Data

US 2006/0131115 A1    Jun. 22, 2006

(30) Foreign Application Priority Data

Dec. 16, 2004    (KR) .................. 10-2004-0106974

(51) Int. Cl.
*F16D 55/14* (2006.01)
(52) U.S. Cl. ............... 188/72.2; 188/72.6; 188/73.1; 188/72.1; 188/156; 188/196 B
(58) Field of Classification Search ............... 188/72.2, 188/72.7, 72.6, 72.9, 73.1, 71.1, 72.1, 156, 188/196 B
See application file for complete search history.

(56) References Cited

U.S. PATENT DOCUMENTS

| 5,348,123 | A | 9/1994 | Takahashi et al. |
| 6,957,723 | B2* | 10/2005 | Baumann et al. ........... 188/72.7 |
| 7,143,873 | B2* | 12/2006 | Pascucci et al. ........... 188/72.7 |

FOREIGN PATENT DOCUMENTS

| JP | 61-286626 | 12/1986 |
| JP | 10-331884 | 12/1998 |
| JP | 11-147458 | 6/1999 |
| JP | 2000-283194 | 10/2000 |
| JP | 2002-048170 | 2/2002 |

* cited by examiner

*Primary Examiner*—Melanie Torres
(74) *Attorney, Agent, or Firm*—Morgan Lewis & Bockius LLP

(57) ABSTRACT

A brake system using an electric motor to provide sufficient braking force by generating the self boosting operation using the motor and rotational inertia of the brake disc, thereby stabilizing the braking operation.

8 Claims, 3 Drawing Sheets

DISC BRAKE SYSTEM DRIVEN BY RACK

CROSS-REFERENCE TO RELATED APPLICATIONS

The present application is based on, and claims priority from, Korean Application Serial Number 10-2004-0106974, filed on Dec. 16, 2004, the disclosure of which is hereby incorporated by reference herein in its entirety.

FIELD OF THE INVENTION

The present invention relates to a disc brake system adapted to produce a braking force at a brake disc by using a motor and rack.

BACKGROUND OF THE INVENTION

Generally, the hydraulic brake system of a vehicle has potential drawbacks in that the hydraulic pipe is susceptible to damage, the response against transmission time of the hydraulic pressure is deteriorated, and the number of components required for the hydraulic pipe is increased.

In order to overcome the above drawbacks, an electric motor can be used to the brake system. However, since only a small electric motor can be mounted in the brake system, sufficient braking force may not be obtained in the brake system.

SUMMARY OF THE INVENTION

Embodiments of the present invention provide a sufficient braking force that is required for the brake system by using an electric motor, thereby stabilizing the braking operation.

A disc brake system driven by a rack according to an embodiment of the present invention includes a caliper body, and an activating brake shoe that is linearly and slidably installed in the caliper body. A motor is installed in the caliper body, and a driving gear is installed at a rotational shaft of the motor. A rack meshes with the driving gear and linearly moves in the perpendicular direction to a brake disc. A self boosting means is located between the rack and activating brake shoe for transmitting the force of the rack to the activating brake shoe. The self boosting means compresses the activating brake shoe toward the brake disc by the force provided from the rack and brake disc.

BRIEF DESCRIPTION OF THE DRAWINGS

For a better understanding of the nature and objects of the present invention, reference should be made to the following detailed description with the accompanying drawings, in which.

DETAILED DESCRIPTION OF THE PREFERRED EMBODIMENTS

Figure 1:
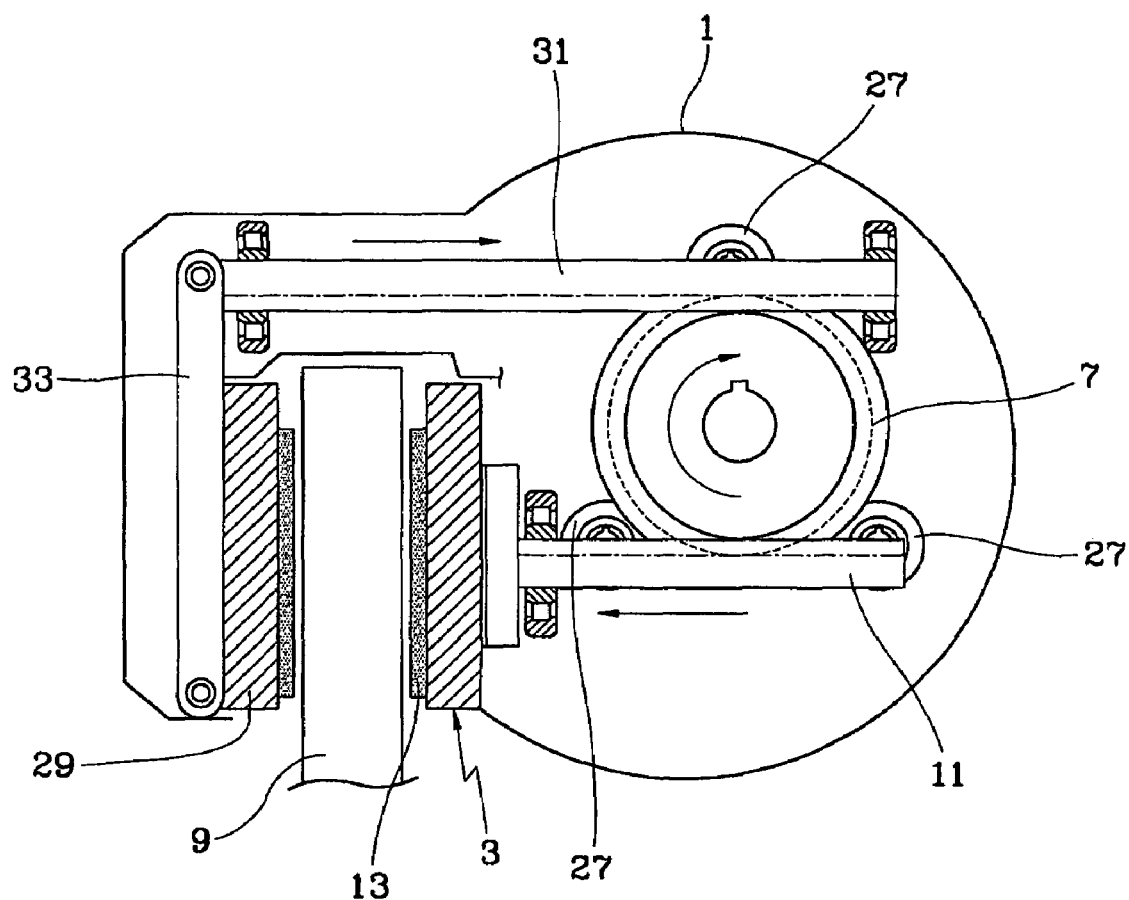
FIG. 1 illustrates a disc brake system driven by a rack according to an embodiment of the present invention.
Figure 2:
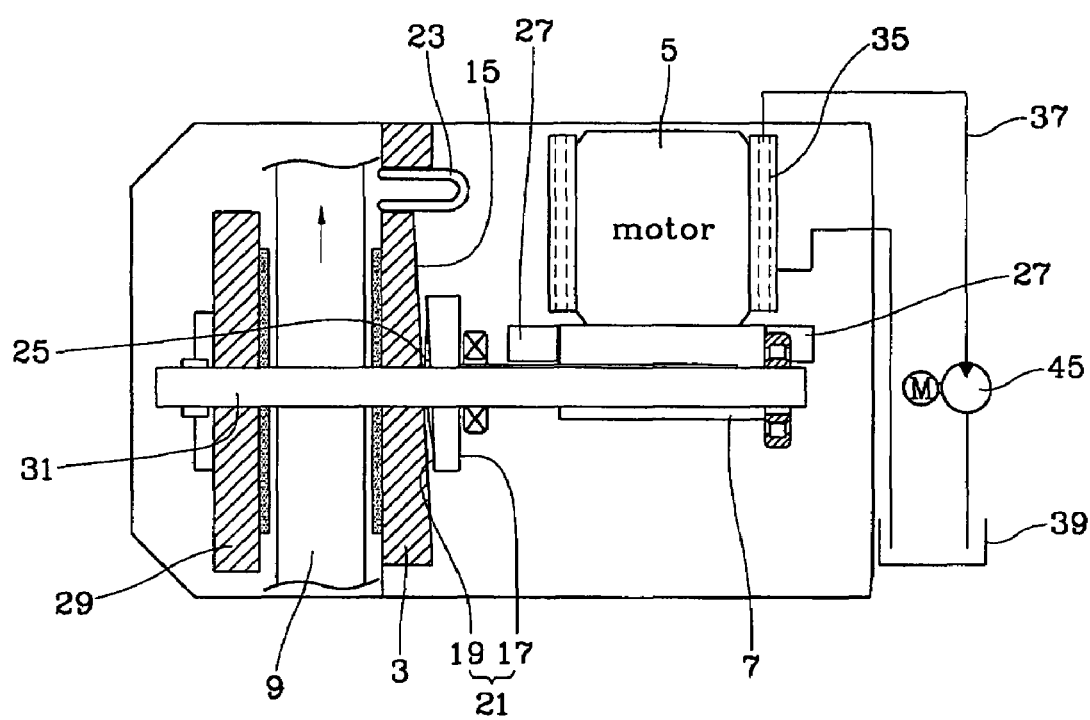
FIG. 2 is a view when observed from the top of FIG. 1.

With reference to FIGS. 1 and 2, an embodiment of the present invention includes a caliper body 1, and an activating brake shoe 3 that is linearly and slidably installed in caliper body 1. A motor 5 is installed in caliper body 1, and a driving gear 7 is installed at a rotational shaft of motor 5. A rack 11 meshes with driving gear 7 and linearly moves in the perpendicular direction to a brake disc 9. A self boosting means is located between rack 11 and activating brake shoe 3 for transmitting the force of rack 11 to activating brake shoe 3. The self boosting means compresses activating brake shoe 3 toward brake disc 9 by the force provided from rack 11 and brake disc 9. A lining 13 is mounted at activating brake shoe 3 to face brake disc 9.

The self boosting means includes an oblique shoe surface 15 and pressure plate 21, wherein oblique shoe surface 15 is formed at activating brake shoe 3 to face rack 11 and make an inclination against the flat surface of brake disc 9. Pressure plate 21 has at both sides thereof an input surface 17, which contacts perpendicularly to the moving direction of rack 11, and an output surface 19 that is parallel to oblique shoe surface 15.

Activating brake shoe 3 is preferably narrowed in thickness to form oblique shoe surface 15 along the rotational direction (during the forward motion of the vehicle) of brake disc 9.

A spring 23 is interposed between the narrowed end of activating brake shoe 3 and caliper body 1. A contact protrusion 25 formed on output surface 19 of pressure plate 21 faces and contacts oblique shoe surface 15 to thereby reduce the contact area of pressure plate 21 and oblique shoe surface 15. A plurality of guide rollers 27 is mounted adjacent to driving gear 7 for guiding driving gear 7.

A second activating brake shoe 29 is placed opposite to activating brake shoe 3 for linearly moving in relation to caliper body 1, and a second rack 31 meshes with driving gear 7. A manipulating link 33 is pivotally connected at one end thereof to second rack 31 while the other end of manipulating link 33 is pivotally connected to caliper body 1, thereby allowing second activating brake shoe 29 to linearly move corresponding to the linear movement of second rack 31.

If second activating brake shoe 29, second rack 31, and manipulating link 33 are provided as described above, caliper body 1 is fixed to a knuckle as a fixed-caliper disc brake. Alternatively, as a floating-caliper disc brake, a fixing brake shoe can be fastened to caliper body 1 in place of second activating brake shoe 29, and caliper body 1 linearly moves in relation to the knuckle via guide pins or the like without second rack 31 and manipulating link 33.

A coolant jacket 35 around motor 5, cooling pump 45 supplying the coolant to coolant jacket 35, pipe 37, and coolant storage 39 are further provided for actively cooling down heat generated from motor 5.

Under the above construction, the brakes are applied by shifting rack 11 and second rack 31 in the arrow directions of FIG. 1 by means of motor 5.

Hence, rack 11 forcibly presses pressure plate 21 toward oblique shoe surface 15 of activating brake shoe 3 so as to secure to brake disc 9. Simultaneously, second rack 31 pivots manipulating link 33, and thus, second activating brake shoe 29 closely attaches to brake disc 9 in the opposite direction of activating brake shoe 3 whereby the braking force is generated.

In reference to FIG. 2, when activating brake shoe 3 compresses brake disc 9 during braking, activating brake shoe 3 receives a force of moving upward in the drawing by the rotational inertia of brake disc 9. Therefore, activating brake shoe 3 slightly moves upward by the above force, and this movement serves as a self boosting function that presses activating brake shoe 3 toward brake disc 9 by using the shape of the oblique surface of activating brake shoe 3 and output surface 19 of pressure plate 21.

Spring 23 prevents an excessive upward movement of activating brake shoe 3 and restores activating brake shoe 3 to its original position during the release of the braking force.

The rotational force of the motor having a small size to be mounted in the caliper body induces the brake shoes to press against the brake disc and to dispose activating brake shoe 3 (as a shim) between pressure plate 21 and brake disc 9, thereby obtaining a sufficient braking force required for the brake system.

Figure 3:
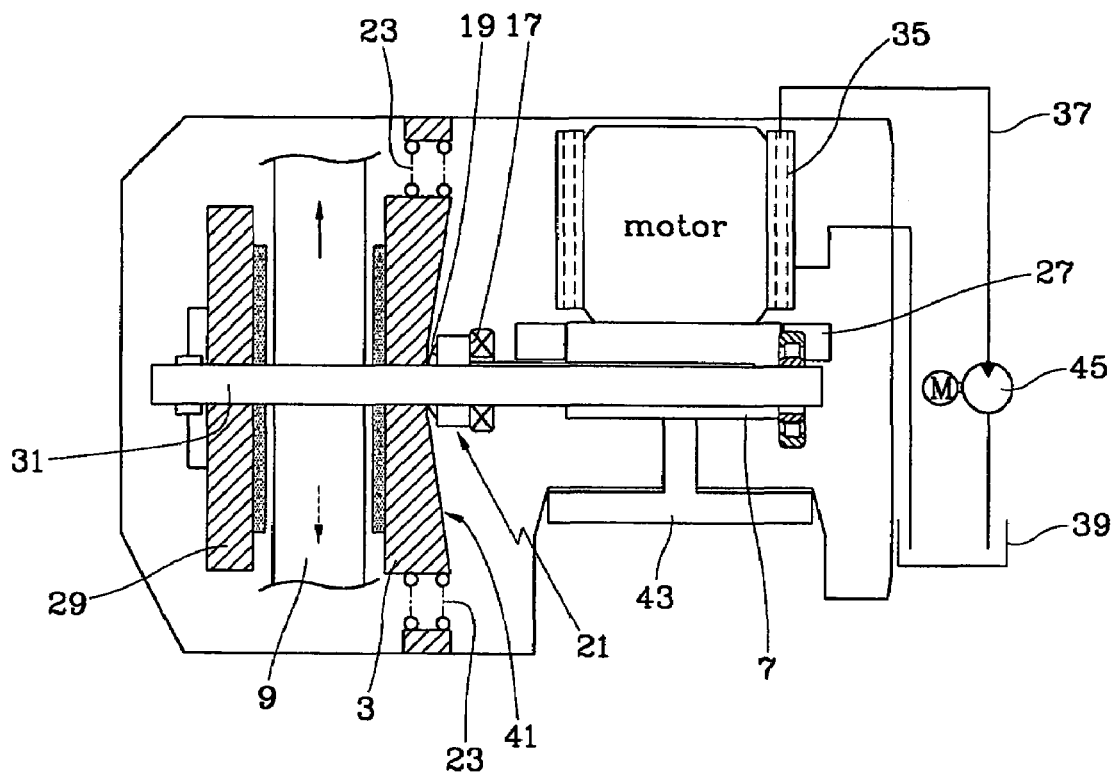
FIG. 3 illustrates another embodiment of the present invention.

Another embodiment of the present invention is illustrated in FIG. 3 in which the configuration is similar to that of the above embodiment except for the self boosting means.

The self boosting means according to the second embodiment includes a V-shaped recess 41 formed at activating brake shoe 3 to face rack 11. Pressure plate 21 has at both sides thereof input surface 17, contacting perpendicularly to the moving direction of rack 11, and output surface 19 having a contact protrusion that protrudes out toward recess 41, respectively.

In the first embodiment, the self boosting operation occurs by pressure plate 21 and oblique shoe surface 15 of activating brake shoe 3 only when the brakes are applied during the forward motion of the vehicle; however, the self boosting operation can occur even during a vehicle's backward motion in the second embodiment.

Provided that the brake system operates while brake disc 9 rotates in the direction of solid arrow in FIG. 3, activating brake shoe 3 moves upward and the lower portion (in the drawing) of V-shaped recess 41 operates with pressure plate 1 to generate the self boosting function. If the brake system operates while brake disc 9 rotates in the direction of the dotted arrow in FIG. 3, activating brake shoe 3 moves downward and the upper portion of V-shaped recess 41 functions as a shim between pressure plate 21 and activating brake shoe 3 to generate the self boosting function.

Spring 23 placed between activating brake shoe 3 and caliper body 1 in the second embodiment prevents an excessive self boosting operation and restores activating brake shoe 3 to its original position.

A manually adjusting lever 43 is further coupled at the rotational shaft of motor 5 for releasing the braking action by manually rotating motor 5 in the course of the maintenance.

As apparent from the forgoing, there is an advantage in that the drawbacks of the hydraulic brake system are overcome by an electric motor, and a sufficient braking force required for the brake system is provided by generating the self boosting function using the motor and rotational inertia of the brake disc, contributing to a stable braking action.

What is claimed is:

1. A disc brake system driven by a rack, comprising:
   a caliper body;
   an activating brake shoe linearly and slidably installed in said caliper body;
   a motor installed in said caliper body;
   a driving gear installed at a rotational shaft of said motor;
   a rack meshing with said driving gear and linearly moving in a perpendicular direction to a brake disc; and
   self boosting means disposed between said rack and activating brake shoe for transmitting force of said rack to said activating brake shoe, wherein said self boosting means compresses said activating brake shoe toward said brake disc by force provided from said rack and brake disc, wherein said self boosting means includes:
   an oblique shoe surface that is formed at said activating brake shoe to face said rack and make an inclination against a flat surface of said brake disc; and
   a pressure plate having at both sides thereof an input surface, which contacts perpendicularly to a moving direction of said rack, and an output surface that is parallel to said oblique shoe surface;
   wherein said output surface of said pressure plate is further formed with a contact protrusion that faces and contacts said oblique shoe surface.

2. The system as defined in claim 1, wherein said activating brake shoe is narrowed in thickness to form said oblique shoe surface along a rotational direction of said brake disc.

3. The system as defined in claim 2, further comprising: a spring interposed between a narrowed end of said activating brake shoe and caliper body.

4. The system as defined in claim 1, further comprising a manually adjusting lever coupled to the rotational shaft of said motor.

5. The system as defined in claim 1, further comprising:
   a second activating brake shoe that is placed opposite to said activating brake shoe for linearly moving in relation to said caliper body;
   a second rack meshing with said driving gear; and
   a manipulating link that is pivotally connected at one end thereof to said second rack while the other end of said manipulating link is pivotally connected to said caliper body to thereby allow said second activating brake shoe to linearly move corresponding to a linear movement of said second rack.

6. The system as defined in claim 1, further comprising:
   a coolant jacket equipped around said motor; and
   a cooling pump that supplies coolant to said coolant jacket.

7. A disc brake system driven by a rack, comprising:
   a caliper body;
   an activating brake shoe linearly and slidably installed in said caliper body;
   a motor installed in said caliper body;
   a driving gear installed at a rotational shaft of said motor;
   a rack meshing with said driving gear and linearly moving in a perpendicular direction to a brake disc;
   self boosting means disposed between said rack and activating brake shoe for transmitting force of said rack to said activating brake shoe, wherein said self boosting means compresses said activating brake shoe toward said brake disc by force provided from said rack and brake disc, wherein said self boosting means includes:
   a V-shaped recess formed at said activating brake shoe to face said rack; and
   a pressure plate having at both sides thereof an input surface, which contacts perpendicularly to a moving direction of said rack, and an output surface having a contact protrusion that protrudes out toward said recess; and
   a spring placed between said activating brake shoe and caliper body.

8. A disc brake system driven by a rack, comprising:
   a caliper body;
   an activating brake shoe linearly and slidably installed in said caliper body;
   a motor installed in said caliper body;

a driving gear installed at a rotational shaft of said motor;

a rack meshing with said driving gear and linearly moving in a perpendicular direction to a brake disc;

self boosting means disposed between said rack and activating brake shoe for transmitting force of said rack to said activating brake shoe, wherein said self boosting means compresses said activating brake shoe toward said brake disc by force provided from said rack and brake disc; and a plurality of guide rollers that is adjacently mounted to said driving gear for guiding said driving gear.

* * * * *